United States Patent [19]
Chartet

[11] 3,756,489
[45] Sept. 4, 1973

[54] FURNACE FOR THE BRAZING IN CONTINUE OF PARTS MADE OF ALUMINIUM MAINLY OF HEAT EXCHANGERS MOVED IN A CONTINUE MOTION

[75] Inventor: Andre Chartet, Hauts De Seine, France

[73] Assignee: Societe Anonyme Des Usines Chausson, Asnieres, Hauts de Seine, France

[22] Filed: Aug. 4, 1972

[21] Appl. No.: 278,086

[30] Foreign Application Priority Data
Aug. 9, 1971 France .............................. 7129092

[52] U.S. Cl. ................... 228/43, 219/85, 219/388, 228/46, 432/122
[51] Int. Cl. ............................................. B23k 1/04
[58] Field of Search ................ 219/85, 388; 228/33, 228/43, 44, 46; 432/122, 123, 128

[56] References Cited
UNITED STATES PATENTS
| | | | |
|---|---|---|---|
| 842,926 | 2/1907 | Walsh .................................. | 228/43 |
| 3,053,212 | 9/1962 | Flynn ................................ | 228/43 X |
| 3,151,591 | 10/1964 | Burns et al. ........................... | 228/44 |
| 3,333,082 | 7/1967 | Randall et al. ........................ | 219/85 |
| 3,566,070 | 2/1971 | Plegat ................................. | 219/85 |
| 3,567,199 | 3/1971 | Holden ........................... | 432/122 X |
| 3,609,295 | 9/1971 | Bielefeldt ............................. | 219/388 |
| 3,637,198 | 1/1972 | Knaak ................................. | 432/128 |

*Primary Examiner*—Volodymyr Y. Mayewsky
*Attorney*—Dwight H. Smiley

[57] ABSTRACT

A furnace for the continuous brazing of aluminum work parts comprising a set of at least 4 adjacent communicating treatment chambers through which the parts to be brazed are successively passed, the chambers being provided with heating means, blowers and vents for circulating hot gas therethrough so as to maintain in the chambers successively higher temperatures and pressures to achieve proper brazing which takes place in the fourth chamber. Additional chambers may be provided for curing and cooling purposes.

13 Claims, 4 Drawing Figures

FURNACE FOR THE BRAZING IN CONTINUE OF PARTS MADE OF ALUMINIUM MAINLY OF HEAT EXCHANGERS MOVED IN A CONTINUE MOTION

BACKGROUND OF THE INVENTION

The present invention relates to the furnace brazing of parts made of aluminium and concerns particularly the brazing of heat exchangers.

It is well known that the brazing of parts made of aluminium meets with great difficulties because said brazing must be performed at a very accurate temperature and under special conditions. It is particularly required that the parts to be brazed be covered with a molten reducing flux before the temperature of said parts is raised to the melting temperature of the brazing alloy.

The presence of the reducing flux causes important problems because said flux is very corrosive and when it has been deposited on the parts to be brazed as an aqueous solution or suspension it is of course necessary to spray the aqueous vehicle which creates very corrosive vapours which are also evolved upon the flux melting during the process of heating the parts to be brazed.

It has been deemed necessary that the flux be made anhydrous and that the radiators or other parts to be brazed not be submitted to important heat differences during their temperature rise up to the brazing temperature, and it has also appeared necessary that the air or other treatment gas providing the temperature rise of the radiators be sent through the radiators in order that all the portions thereof be evenly treated and the flux vapours be eliminated.

Moreover, it has also appeared desirable that heating should be performed in the most economical way possible while providing that the parts are in an atmosphere which can be carefully controlled at least when the brazing process itself is performed.

SUMMARY OF THE INVENTION

According to the present invention, a brazing furnace adapted for continuous operation is provided which comprises, (a), a first (a) chamber in which hot air is passed through the radiators or other parts for the purpose of drying a flux covering the same, said hot air being then directly discharged from said first chamber, (b) a preheating chamber including flame-burners and a blower causing the hot gas to circulate through the radiators by recycling said gas, at least partially, (c) a third and a fourth identical chambers including electric heating resistances across which a gas is sent in closed cycle to be brought to pass through said radiators, said radiators being raised in said third chamber to a temperature higher than the melting temperature of the flux and close to the brazing temperature, and being raised in the fourth chamber of a temperature to the brazing temperature.

DETAILED DESCRIPTION OF THE INVENTION

Figure 3:
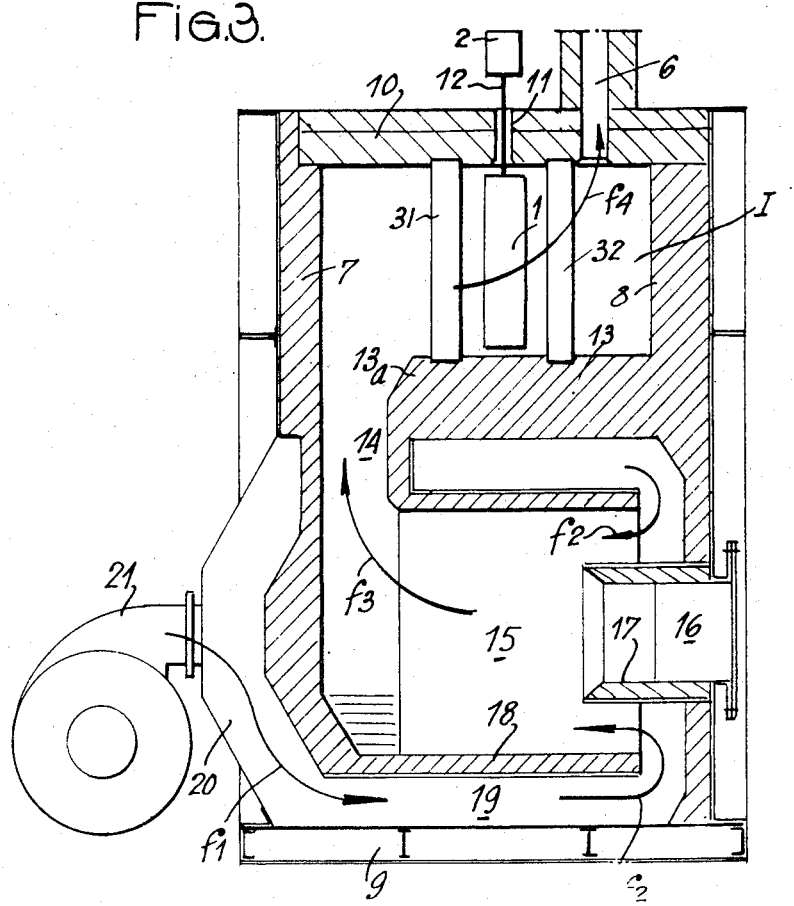
FIG. 3 is a transverse sectional view of one of the portions of the furnace of FIG. 2.

In the drawings, reference numeral 1 designates radiators made of aluminium, said radiators being placed, if required, upon supporting members and being brought, by means of a conveyor 2 in FIG. 3, inside the furnace after said radiators have been submitted to a fluxing step performed, for instance, by means of members 3 spraying on an aqueous flux ; said fluxing step can be performed through dipping into a bath, said dipping being then followed by a draining.

The furnace as shown in the drawings comprises successive chambers designated respectively by I, II, III, IV, V and VI.

The cell I is designed to entirely dry the flux impregnating the successive radiators 1 and said chamber, inside of which the radiators are raised to a temperature of about 120°C, includes one or several flame-burners 4, for example gas-burners. The burners 4 are designed to heat the air introduced by a blower or a turbine 5, said air being brought into said chamber I to be heated by said burners 4 before passing through the radiators 1 and being blown out into the atmosphere through a ventilating shaft 6.

Preferably, the blower 5 is placed outside the chamber I to prevent said blower from being in contact with the vapors charged with flux contained into said chamber, said vapors being sent out through the ventilating shaft 6, either directly to the atmosphere or to a purification and recovery installation (not shown).

It is desirable to construct the chamber I as shown in FIG. 3 which represents the furnace constructed either by a masonry assembly or made of stainless metal, and comprising two lateral walls 7 and 8 rising, from a base 9 and connected at the top portion thereof by a ceiling 10 through which emerges the ventilating shaft 6. The ceiling 10 also includes a slot 11 through which are running conveyor slings 12 connecting the members containing the radiators 1 to the conveyor 2. The lateral wall 8 supports a partition 13 extending on the whole length of the chamber I and consequently forming the floor of the same. The space between the extremity 13a of partition 13 and the lateral wall 7 constitutes a passage 14 of same length as that of chamber I, said passage communicating with a combustion chamber 15 into which the burner 3 is inserted into the area 16 and extends into a tip 17 supported by the wall 8. A ring-shaped sheath 18 defines, around the combustion chamber 15, an annular canal 19 communicating through a duct 20 with the outlet of a centrifugal blower 21. The air discharged by the blower 21 is brought through the duct 20, according to the direction of arrow $f_1$, into the annular canal 19 from which this air is distributed according to arrows $f_2$ concentrically to the periphery of the tip 17. The air thus introduced constitutes combustion secondary air inside the chamber 15 and the hot gas produced is then sent according to arrow $f_3$ through the passage 14 into the chamber I itself. Thus said air goes through the radiators which are moved into said chamber I, said hot gas becoming thus impregnated with humidity and being sent out according to arrow $f_4$ through the ventilating shaft 6.

Figure 1:
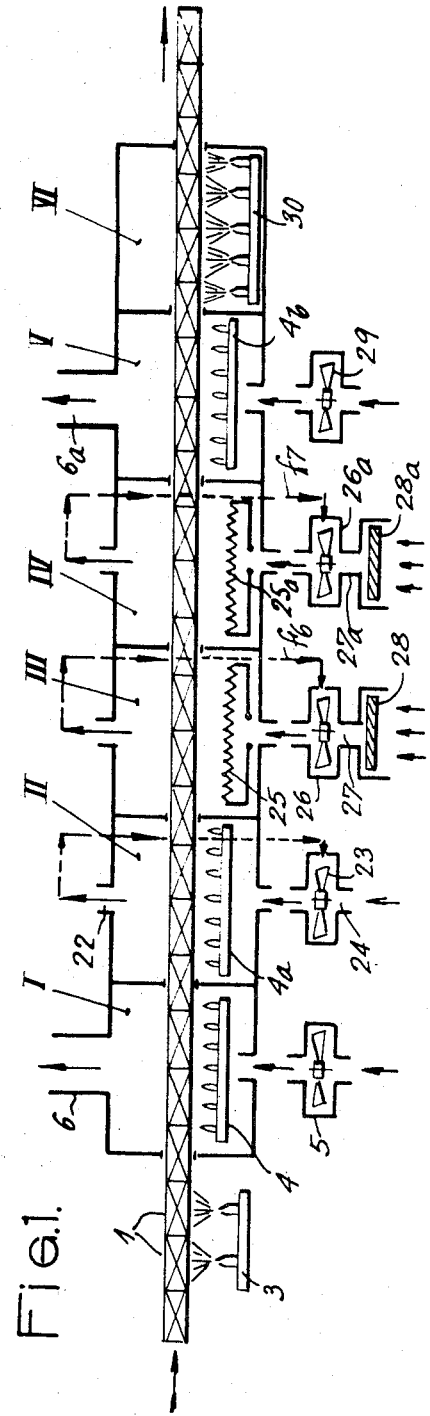
FIG. 1 is a diagrammatic side elevation partially in section of the brazing furnace of the invention.

The radiators are then transferred into the chamber II (FIG. 1), this chamber also including flame burners 4a. The chamber II can be constructed in a similar manner as above described with reference to FIG. 3, but preferably the hot gas is recovered at an outlet 22 which outlet can be similar, ventilating shaft 6 of FIG. 3 - to be brought to the inlet of a blower 23 again introduces said gas into the chamber II with addition of complementary air from an inlet 24 placed on the admission side of the blower 23. Thus, the hot gas is recycled into the chamber II, thereby utilizing burners 4$^a$ having a relatively low power since the quantity of heat to be brought to the chamber II then corresponds only to the heat sent to the radiators, the temperature of the same being raised to about 550°C, and to the heat which has been lost due to air leaks and conduction into the furnace.

According to an advantageous feature, the pressure in chamber II is maintained, by means of the blower 23, slightly higher than the pressure in the chamber I thus directing leaks from the chamber II towards the chamber. Thus, moist vapors containing the flux cannot penetrate into said cell II.

The adjacent portion of the furnace comprises two chambers III and IV which are both, constructed in a similar way and each of which includes electrical heating resistances 25, 25a, respectively, designed to raise the temperature in the chamber III clse to 600°C, that is, higher than the melting temperature of the flux, and to raise the temperature in the chamber IV to the exact melting temperature of the brazing alloy covering at least partially the radiators 1.

The chambers III and IV each includes a blower 26 and 26a, respectively, providing — as shown by arrows $f_6$, $f_7$ — for the recycling of the hot air present said chambers, said hot air being caused to circulate through the radiators to be brazed. The blowers 26 and 26a — the hot gas being brought to the intakes thereof as diagrammatically shown by arrows $f_6$, $f_7$ — advantageously comprise a secondary inlet 27 or 27a connecting them to the outlet of treatment systems 28 or 28a through which the air having to penetrate into the chambers III, and IV respectively, is treated, and especially dehydrated.

In the illustration shown, the blowers 26 and 26A are set in such a way that pressure in cell IV is, preferably, slightly higher than pressure in cell III, and also the pressure in said chamber III is in turn preferably higher than the pressure in chamber II. Thus the leaks necessarily occurring establish an air flow sent on one hand towards the ventilating shaft 6 of the chamber I and, on the other hand, towards the chamber V, while chamber IV in which there must prevail an atmosphere which is the more suitable for the brazing process has no chance to become contaminated.

The chamber V is preferably constructed similar to the chamber I and includes, like the latter, flame-burners 4b having an intermittent operation, especially designed when starting the furnace to heat some air introduced by a blower 29 and sent out through an air-shaft 6a. The temperature in the chamber V is preferably maintained at about 300°C, for example, by adjusting the blower flow, to provide for the setting and pre-cooling of the brazing.

The last portion of the furnace comprises the chamber VI which is a zone into which the radiators are introduced in to a coolling step and eventually to tempering step, for example by means of spraying banks 30.

The chambers III and IV, which are electrically heated, can contain an atmosphere which is different from the atmosphere in the other chambers of the furnace such as, for example, a nitrogen or another inert gas. In such a case, said gas is brought to the blowers 26, respectively 26a, by a duct instead to be connected to the treatment systems 28 or 28a.

Figure 2:
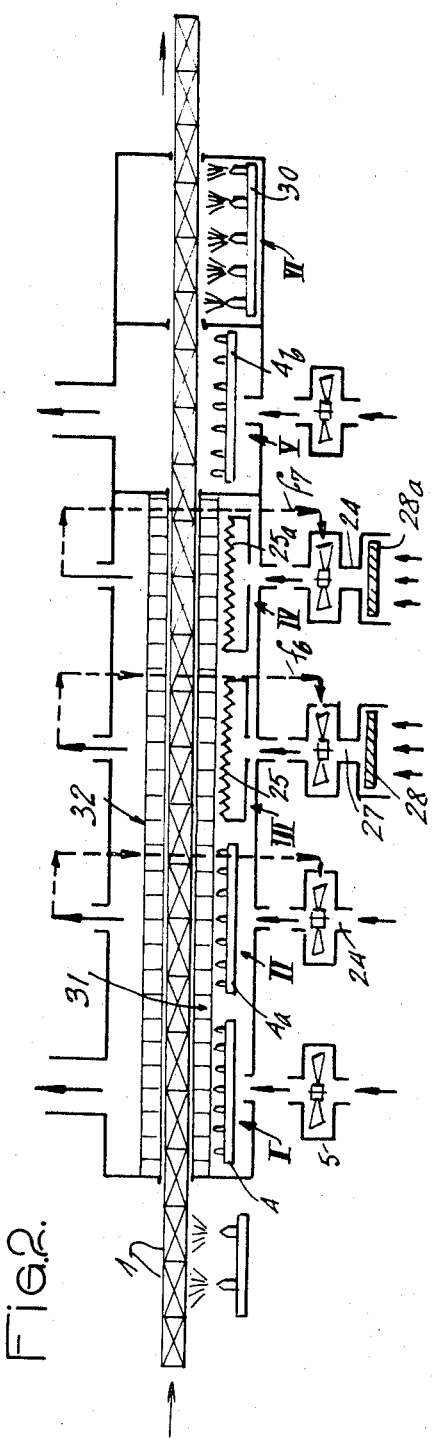
FIG. 2 is a diagrammatic side elevation similar to FIG. 1, showing an additional feature.

FIG. 2 shows a further development of the invention wherein directing grates 31 and 32, extending preferably in continuity, are placed on each side of the radiators 1 thus defining a narrow interval for the passage of the same, said grates traversing at least the chambers I to IV. When such grates are provided, then the chambers I to IV do not have to be materially divided, thus the successive treatments, i.e. drying into chamber I, pre-heating into cell II, heating in cell III and brazing in chamber IV; are performed by a progressive rise in temperature of the radiators 1, the separation between the successive treatment zones being only provided by the differences in the blowing pressures and of the flow from the different blowers as above described.

Figure 4:
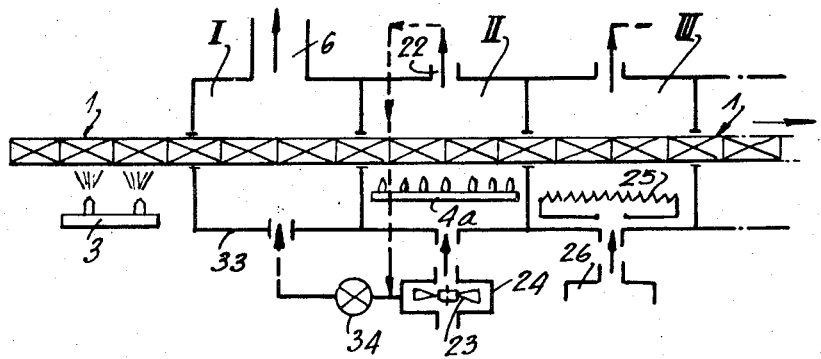
FIG. 4 is a partial diagrammatic section view similar to FIG. 1, showing a variation.

FIG. 4 illustrates another development of the invention according to which it becomes possible to avoid locating the blower 5 of chamber I outside of said chamber as shown in with reference to FIG. 3. In that case the chamber II is equipped as described with reference to FIG. 1 and a by-pass conduit 33, controlled by a valve 34 is positioned for example at the intake of blower 23 of chamber II, said by-pass 33 connecting to the inlet of chamber I.

It appears from the above disclosure that in chamber II there is achieved an only partial recycling of the hot gas designed to ensure the pre-heating of radiators 1, a portion of the gas having ensured said pre-heating being then directed through the by-pass 33 to the chamber I, the quantity of gas so directed and which is controlled by valve 34, is determined in such a way that the tempertute prevailing in said chamber I is about 120°C, as already described.

The invention is not restricted to the embodiments shown and described in detail, since various modifications thereof can moreover be applied to it without departing from the scope of the invention. Especially the chamber II can be constituted similarly to the chamber I, the gas passing through the same being sent out instead of being at least partly recycled. Also, as above described, when it is mentioned that the gas is sent by the blowers, it indicates that said blowers are, with no difference, placed to intake the gas sent by the cells or to blow out said gas into the cells.

I claim:

1. Furnace for the continuous brazing of aluminum work parts comprising in combination:
   a. a set of at least 4 adjacent communicating work treatment chambers;
   b. conveyor means for continuously moving the work parts to be brazed successively through said chambers;
   c. means for holding the work parts in position for brazing;
   d. means for applying an aqueous brazing flux to the work parts prior to their entry into the first chamber;
   e. the first of said chambers including means for circulating a hot gas therethrough to contact the work parts and to dry said flux;
   f. the second of said chambers including means for circulating a hot gas therethrough to raise the temperature of the work parts to a level below the melting temperature of the flux;

g. the third of said chambers including heating means for raising the temperature of the working parts to a level above the melting temperature of the flux;

h. the fourth of said chambers including heating means for raising the temperature of the work parts to the brazing temperature, and i. said gas circulating and said heating means being adapted to maintain in said chambers successively higher temperatures and pressures to achieve proper brazing of said work parts.

2. The furnace of claim 1 which further includes a fifth chamber communicating with said fourth chamber including means for circulating a hot gas therethrough to maintain the temperature of said brazed work parts.

3. The furnace of claim 2 which includes a sixth chamber communicating with said fifth chamber, including means for tempering and cooling the brazed work parts.

4. The furnace of claim 3 in which said tempering and cooling means includes means for spraying a cooling medium onto said work parts.

5. The furnace of claim 2 in which said hot gas circulating means includes means for adjusting the flow of said gas to gently pre-cool said brazed work parts.

6. The furnace of claim 2 in which the means for circulating hot gas are adapted to maintain pressure of the hot gas in the chamber decreasing from the fourth chamber to the first chamber and to maintain substantially the same pressure in the fifth chamber and in the third chamber thereby preventing gas at a lower temperature from entering the fourth chamber in which brazing is performed.

7. The furnace of claim 1 in which the hot gas circulating means in the first and second chamber comprises a gas burner, a blower, and a gas inlet and outlet.

8. The furnace of claim 1 in which the said heating means in the third and fourth chambers comprises an electrical resistance, a blower, and a gas inlet and outlet.

9. The furnace of claim 1 in which said third and fourth chambers include means for the introduction of additional gas to compensate for leakage.

10. The furnace of claim 1 which includes blower means located outside each of said chambers for introducing gas thereto, means for heating the gas located within said chambers, conduits for conveying the gas into the interior of the chamber and past the heating means, and thence carrying the hot gas past said work parts, and a ventilating shaft in the upper portion of the chamber for removal of used hot gas.

11. The furnace of claim 10 in which said conduit is a ring-shaped sheath defining a combustion zone adjacent said heating means.

12. The furnace of claim 1 in which said second chamber includes conduit means for recovering hot gas leaving the work parts and for conveying the gas partly to said first chanber and partly to recycle the gas back to said second chamber.

13. The furnace of claim 1 in which said conveyor means comprises longitudinal grates and said chambers are defined by the differences of temperature and pressure of the hot gas circulating through said grates.

* * * * *